United States Patent [19]

Lannuzel et al.

[11] Patent Number: 4,619,267
[45] Date of Patent: Oct. 28, 1986

[54] METHOD FOR CHARACTERIZING THE STRUCTURE OF A MEDIUM AND DEVICE FOR CARRYING OUT THE METHOD

[75] Inventors: Olivier Lannuzel, Meaux; Thierry Pradal, Creteil, both of France

[73] Assignee: CGR Ultrasonic, Paris, France

[21] Appl. No.: 682,756

[22] Filed: Dec. 14, 1984

[30] Foreign Application Priority Data

Dec. 16, 1983 [FR] France ................... 83 20198

[51] Int. Cl.$^4$ ............................. A61B 10/00
[52] U.S. Cl. ........................ 128/660; 73/602
[58] Field of Search ............... 128/660–661; 73/597, 599, 602

[56] References Cited

U.S. PATENT DOCUMENTS 4,389,893 6/1983 Ophir et al. .................. 73/599
4,452,082 6/1984 Miwa ........................ 73/602

FOREIGN PATENT DOCUMENTS 0042601 12/1981 European Pat. Off. .
0064399 11/1982 European Pat. Off. .
0092841 11/1983 European Pat. Off. .

OTHER PUBLICATIONS

Alta Frequenza, vol. 44, No. 8, Aug. 1975, pp. 462–468, Milano (IT); C. Braccini et al.: "Variance Properties . . .".

Review Scientific Instruments, vol. 46, No. 3, Mar. 1975, pp. 269–277, New York (U.S.A.); Z. Kam et al.: "Simple Schemes . . .".

Journal of Physics E.; Scientific Instruments, vol. 8, No. 3, Mar. 1975, pp. 206–208, London (GB); Ichiro Tai et al.: "A Real Time Correlator . . .".

Primary Examiner—Kyle L. Howell
Assistant Examiner—Francis J. Jaworski
Attorney, Agent, or Firm—Roland Plottel

[57] ABSTRACT

The invention relates to a method for characterizing the structure of a medium in which the ultrasonic absorption coefficient of the medium is measured. In order to perform a spectral analysis of this absorption, the spectrum of the signal reflected after it has been transmitted is evaluated by means of an autocorrelation method. Application: medical practice.

16 Claims, 6 Drawing Figures

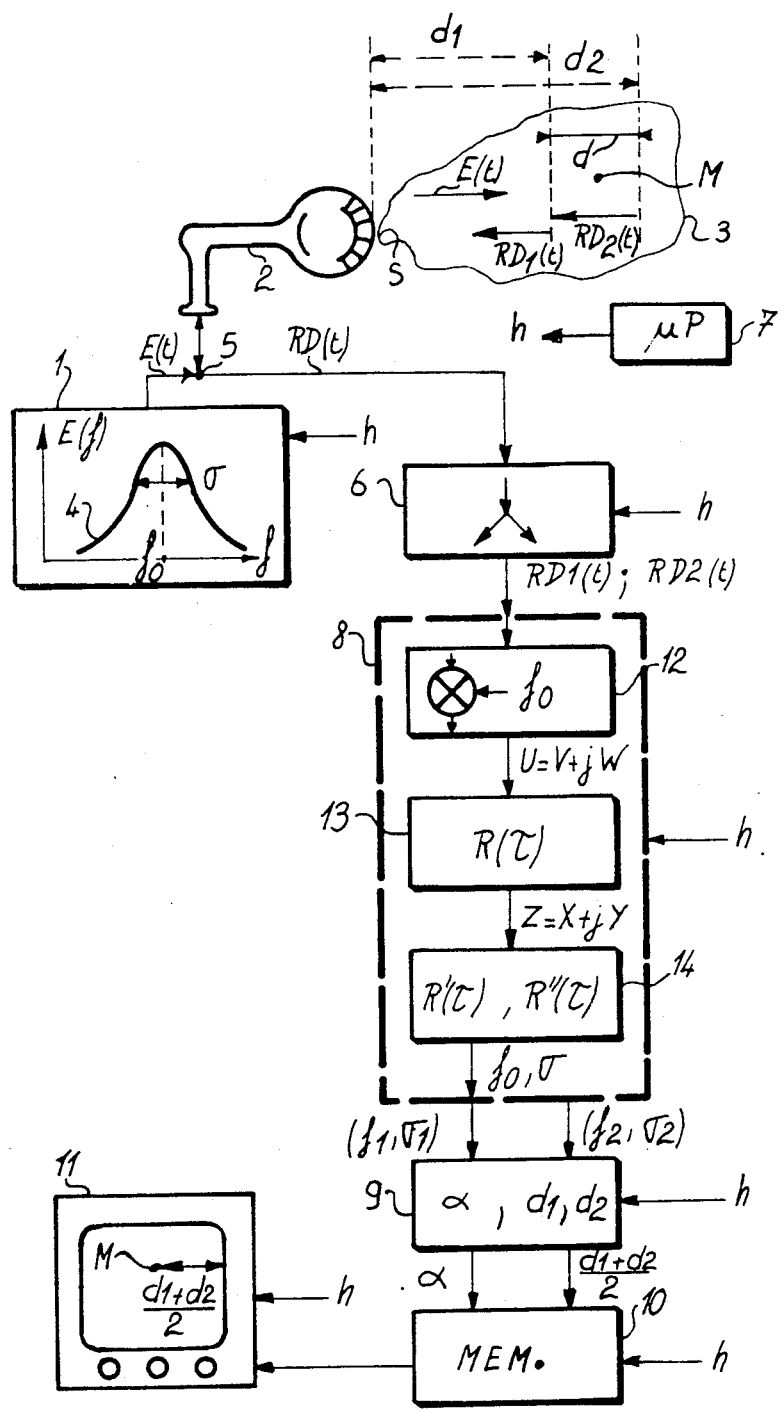
FIG_1

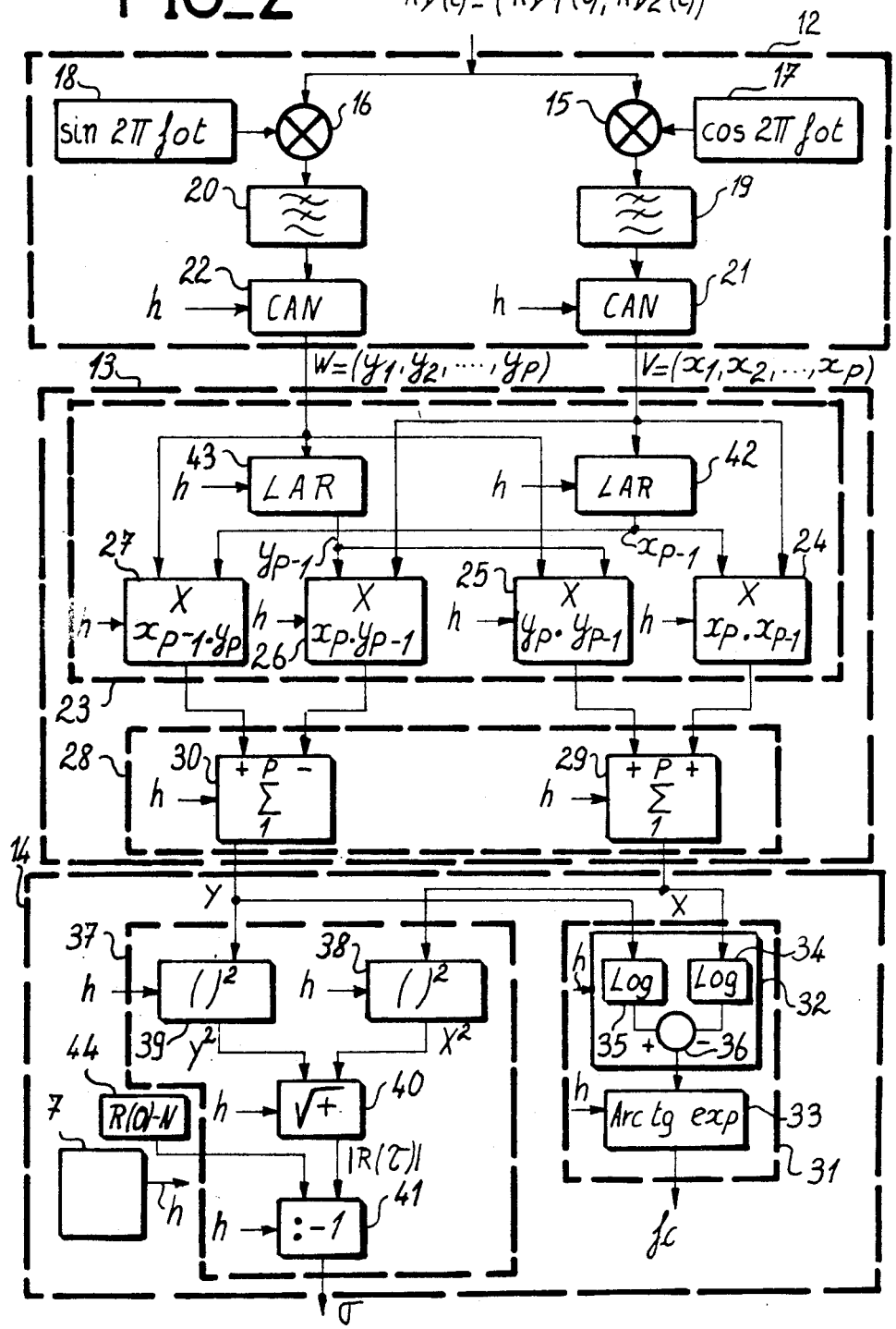

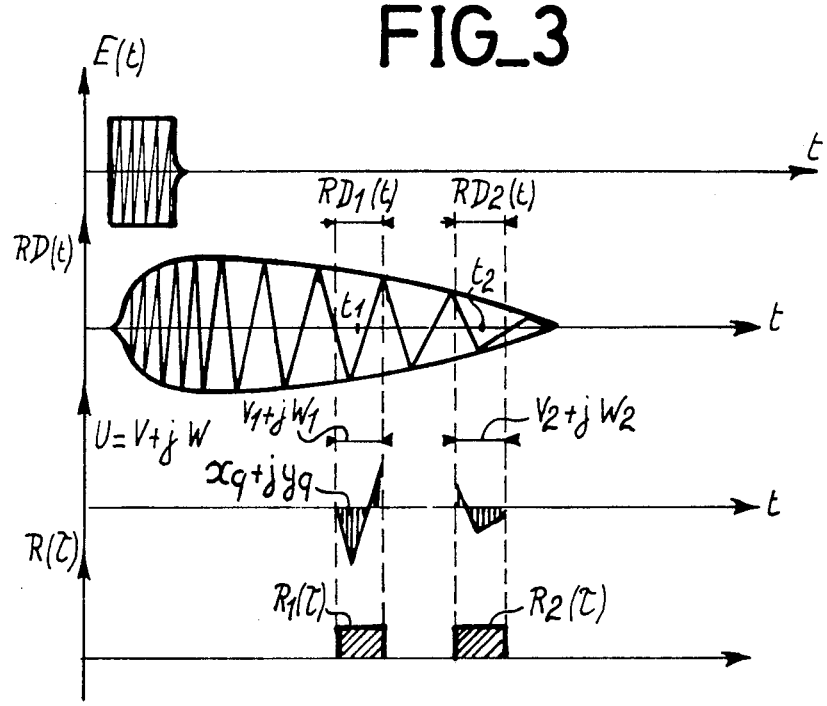
FIG_3
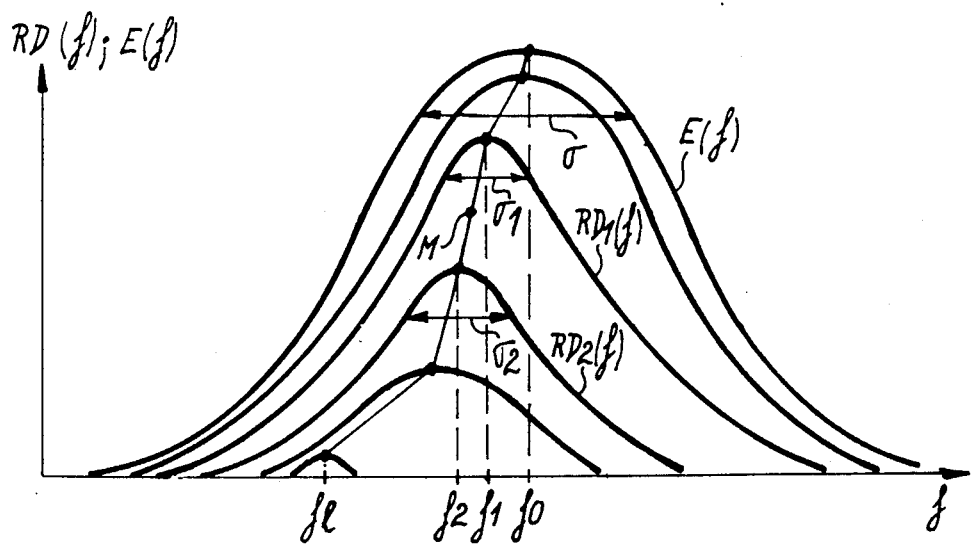
FIG_4

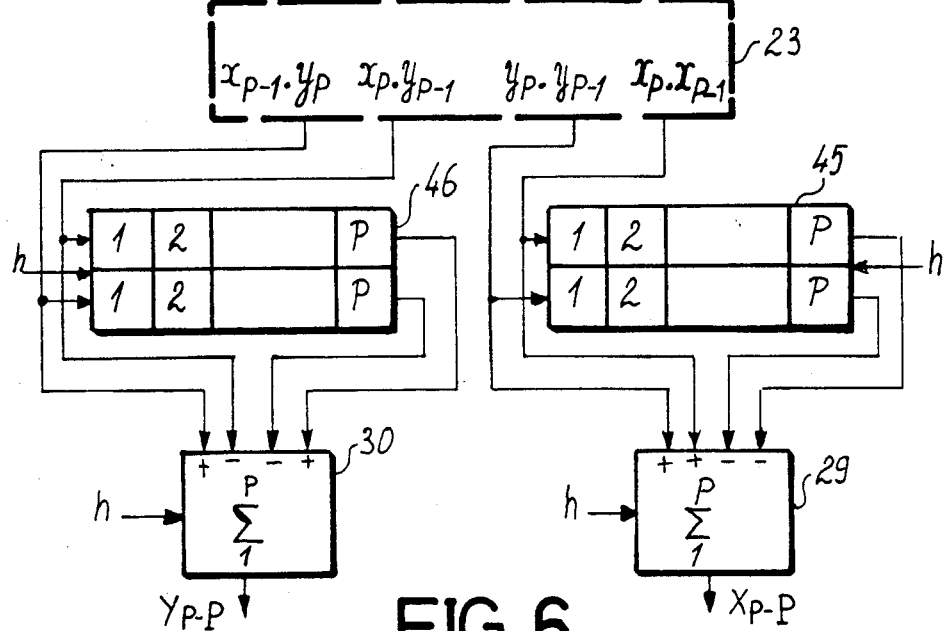
FIG_5
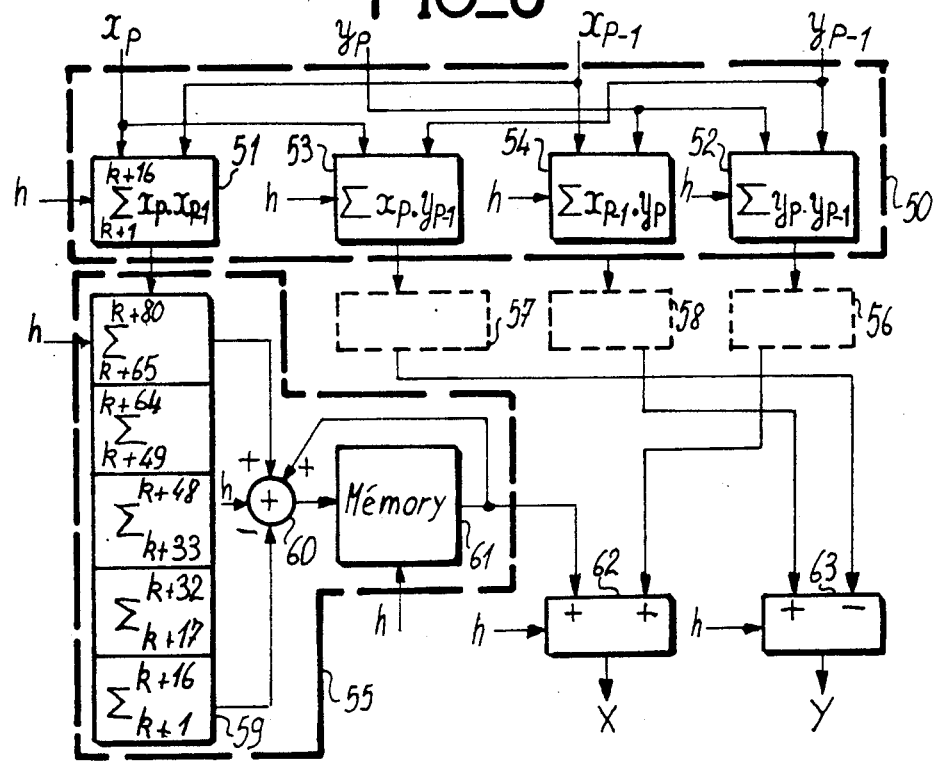
FIG_6

METHOD FOR CHARACTERIZING THE STRUCTURE OF A MEDIUM AND DEVICE FOR CARRYING OUT THE METHOD

BACKGROUND OF THE INVENTION

The present invention relates to a method for characterising the structure of a medium and to a device for the application of this method. It is applied more particularly in the medical field for characterising human body tissues by means of ultrasonic investigation processes, but it may have an application for all other kinds of media. As a matter of fact, the characterisation of the media referred in the present invention reveals the fact that these media are able to absorb ultrasonic vibrations to a greater or lesser extent as a function of the frequency of the ultrasonic excitation beam. The principle of the measurements which then permit establishing the absorption coefficient of a medium consists in transmitting an ultrasonic signal towards this medium and in measuring the ultrasonic signal reflected by this medium and to then derive the absorption coefficient therefrom by comparing the signal transmitted and the signal reflected.

A review of the prior art is given in the paper of Messrs. P. A. Narayana and J. Ophir in the periodical "Ultrasonic Imaging" 5, 17–21, of 1983. This refers to the absorption coefficient $\alpha$ of a medium of which the magnitude is expressed in dB per cm and per megahertz (dB/cm/MHz). This coefficient $\alpha$ demonstrates that, for example, an ultrasonic beam transmitted at 10 MHz and which had penetrated into the medium to a depth of 5 cms (10 cms there and back) will have undergone an attenuation of 100 $\alpha$dB (100 dB if $\alpha=1$) on re-emerging from the medium. As recalled by the paper quoted, the coefficient $\alpha$ is related to the frequency of the excitation beam by the relationship $\alpha(f)=\alpha_0 f^b$. In practice, b assumes a value comprised between 1 and 2 for all the media and for biological media in particular.

This paper equally demonstrates that if the Fourier spectrum of the excitation signal is gaussian about a mean frequency $f_0$, the spectrum of the reflected signal is equally gaussian but is centred around a central frequency $f_c$ which also depends on the distance separating the surface of the medium through which the ultrasonic beam had entered from the zone of this medium which had reflected the signal. Allowing for a comparatively constant speed of propagation in the medium (1540 m/sec for media charged with water) a signal reflected by a zone of the medium re-appears at the surface of this medium at the end of a period of a longer or shorter duration depending on the greater or lesser distance at which this zone is situated from this surface.

In this way, if two zones of a medium are considered, being zones 1 and 2, an ultrasonic excitation having a gaussian spectrum and reflected by each of these zones will appear again at the surface of the medium at different instants $t_1$ and $t_2$. Apart from appearing at different instants, these reflected signals have different characteristics as regards amplitude and frequency spectrum. The amplitude of the signal reflected by the farthest zone, for example the section 2, is smaller than the amplitude of the signal reflected in the closest zone since this oscillation had described a longer outward and return trajectory within the medium than the latter. For a given excitation pulse, the signal received consequently decreases with time. Furthermore, the Fourier spectra of these two reflected signals are different because, since the absorption factor depends on the frequency, the high frequencies of each of their spectra undergo an attenuation as compared to their low frequencies which is the greater the longer its persistence, that is to say the farther the zone of origin of the reflected signal is situated from the surface. What this paper confirms, in the final analysis, is that despite this attenuation incurred as a function of the frequency, the spectra of the reflected signals are equally gaussian, the first around a central frequency $f_1$ and the second around a central frequency $f_2$, with $f_1$ being greater than $f_2$. If $\sigma$ denotes the typical difference of the gaussian distribution of the spectrum transmitted, it may then be stated that the absorption coefficient at a point of the medium situated between the zones 1 and 2 will have as its value:

$$\alpha = \frac{f_2 - f_1}{2\sigma^2(d_1 - d_2)}$$

In this expression, $d_1$ and $d_2$ are respectively the abscissae measured along the axis of propagation and reflection of the zones 1 and 2 with respect to the surface of the medium through which the ultrasonic oscillations enter and re-emerge. In other words, to determine $\alpha$ at a given point of the medium, $f_1$ and $f_2$ should be measured at abscissae $d_1$ and $d_2$ which are smaller and larger, respectively, than the abscissa of the point in question. The selection of the reflected signals RD1 (t) and RD2 (t) corresponding to the zones having abscissae $d_1$ and $d_2$ may be obtained by opening reception time windows at instants $t_1$ and $t_2$ respectively, which are related with these abscissae and with the speed of propagation c by a relationship equivalent to:

$$t_q = \frac{d_q}{c}.$$

The reflected signals RD1 (t) and RD2 (t) then comprise the useful data for the central frequencies $f_1$ and $f_2$ in their Fourier spectrum. For the sake of a clearer understanding, reference may profitably be made to the mathematical developments described in the paper quoted and in particular to formulae Nos. 11 and 17 from which had been derived the preceding expression for $\alpha$ as a function of $f_2$ and $f_1$. It will be noted in this respect that the frequency differences $f_2-f_0$ which amount to quantities of the order of 250 KHz in many cases, comply perfectly, in respect of an ultrasonic oscillation transmitted at 10 MHz, with the supplemental condition for validation of the theory which stipulates that the relative shift from the mean transmission frequency should be lower than 20% (250/10,000 lower than 20%).

Until the present invention, it was known to measure $f_1$ and $f_2$ by calculating the complete spectrum RD1 (f) and RD2 (f) of each of the signals reflected by means of devices performing a fast Fourier transformation of the signal (abbreviated to FFT). As a matter of fact, these FFT devices perform a discrete Fourier transformation of the signal. This means that for each signal reflected, RD1 (t) or RD2 (t), the signal received is demodulated by means of two oscillators in phase quadrature, each of the two signals demodulated in this manner is filtered by means of a low-pass filter and quantified samples are taken by means of a blocking sampler followed by an analog/digital converter at the rate of a sampling frequency. The FFT devices thus collect a plurality of successive samples and, after a calculation period, supply a set of digital values representing the amplitude of each of the lines of the spectrum of the signal investigated. Calculations in respect of mean value and typical spectrum shift are then performed on these line amplitudes.

These FFT devices however have a first disadvantage which is related to their calculator circuit. As a matter of fact, these can operate only on a number of samples which is a power of 2: for example 64 or 128 samples. In so far as it is understandable that the accuracy of the results obtained by this method increases in direct proportion to the number of samples, it is no less understandable that this method implies assumptions regarding the stationary nature of the medium investigated. If this medium is movable, it is necessary to consider the same stationary for a limited period only, which leads to a reduction of the number of samples to be taken into account for a given measurement precision. If, making allowance for the stationary state, the optimum number of samples is of the order of 90 for example, it is observed that the measurement by means of FFT devices presents disadvantages since 90 is not a power of 2.

Furthermore, the reflected signal being affected by noise, the results secured by the FFT method are impaired by mensuration faults. Finally, these FFT devices require the application of many electronic functions and the implementation of a great number of operations. Furthermore, the need to acquire all the samples prior to any calculation, militates against real time applications in which all the points of a medium are scanned in turn and in which it is a requirement to ascertain the absorption coefficient of the different points as and when they are scanned. These real time applications are sought after in particular when it is wished to plot a graph for the factor $\alpha$ by means of display devices, for example on a television monitor.

SUMMARY OF THE INVENTION

The invention has as its object to overcome the shortcomings listed, by formulating the problem in a different manner. As a matter of fact the user has no interest in the complete spectrum of each of the signals reflected, but merely in their mean and their typical difference. Furthermore, rather than calculate the amplitudes of each of the lines of the spectrum and then perform time calculations on this amplitude distribution permitting evaluating the mean frequency and the typical difference, it proposes a method which whilst being less exhaustive as regards knowledge of the phenomenon, performs a direct and exclusive calculation of the results of interest to the user. The invention arises from the following premises: that there is a close relationship between the spectral density RD (f) of a signal RD (t) and the function of autocorrelation R ($\tau$) of this signal RD (t), and that the momentum of orders n of RD (f) are equal to the derivatives of orders n of the autocorrelation function calculated for $\tau=0$. This may be set down in the form of a general expression for the momentum:

$$\frac{1}{(j2\pi)^n} \cdot \frac{d^n R(\tau)}{d\tau^n} = m_n = \int f^n \cdot RD(f) \cdot df$$

at $\tau = 0$

The invention relates to a method for characterising the structure of a medium during which the following operations are performed successively:
a pulsed acoustic signal of which the frequency spectrum is gaussian around a mean frequency is transmitted towards the medium,
a first acoustic signal reflected by a first zone of the medium is received at a given instant, and a second acoustic signal reflected by a second zone of the medium is received at a subsequent instant,
the spectrum analysis of the two signals reflected is established to obtain the central frequency from the Fourier spectrum of each of these reflected signals,
the acoustic absorption coefficient of the medium between the two zones is calculated on the basis of the central frequencies obtained for each of these zones, on the one hand, and on the other hand of the distance separating these zones,
characterised in that the said spectrum analysis consists in:
performing a demodulation, in phase quadrature and at the said mean frequency, of the two signals reflected,
calculating the autocorrelation functions of these demodulated signals, and
in calculating the derivatives of the first order of these autocorrelation function representing the said central frequencies.

The invention equally relates to a device for characterising the structure of a medium, which comprises:
means for transmitting towards the said medium a pulsed acoustic signal of which the frequency spectrum is gaussian around a mean frequency,
means for receiving the acoustic signal upon being reflected by the said medium,
means for selection from this reflected acoustic signal of a first and second reflected signals corresponding to first and second zones of the said medium,
spectrum analysis means for obtaining the central frequencies from the Fourier spectrums of each of these two reflected signals, and
means for calculating the acoustic absorption coefficient of the medium between the said two zones, on the one hand based on the central frequencies obtained, and on the other hand based on the distance separating these sections,
characterised in that the spectrum analysis means comprise:
means for performing a demodulation in phase quadrature and at the said mean frequency of the two signals reflected,
means for calculating the autocorrelation functions of these signals once they have been demodulated, and
means for calculating the derivatives of the first order of these autocorrelation functions representing the said central frequencies.

BRIEF DESCRIPTION OF THE DRAWINGS

A better understanding of the invention will be obtained from the following description and accompanying drawings. These are not restrictive as regards either the method or the device according to the invention. Identical symbols are used to denote identical elements in these drawings, in which:

FIG. 1 illustrates one device in accordance with the invention,

FIG. 2 illustrates one particular embodiment of the device in accordance with the invention, FIG. 3 illustrates time diagrams for the signals playing a part in the method according to the invention, FIG. 4 illustrates a graph of the spectrums of the signals reflected by different points of the medium, FIGS. 5 and 6 illustrate two circuits enabling application of a modified form of the invention.

DESCRIPTION OF THE PREFERRED EMBODIMENTS

FIG. 1 illustrates a device in accordance with the invention. It comprises a generator 1 which, after a filtering action attributable to a sensor 2, transmits an ultrasonic signal E (t) into a medium 3. The spectrum E (f) of E (t) has the form of a Gaussian curve 4 centred around a central frequency $f_0$ and having a typical shift $\sigma$, substantially equivalent to the 3 dB band of this spectrum, since it is gaussian. The signal E (t) transmitted to the surface S of the medium 3 is propagated in this medium and reflected as signals RD1 (t) and RD2 (t) respectively by a first and second zones situated, respectively, around the abscissae $d_1$ and $d_2$ on the axis of propagation from the surface S. The signal E (t) is comparatively short, and lasts say 6.4 microseconds in one example. Once the signal E (t) has been transmitted, the sensor 2 of a piezo-electric kind operating successively in the transmission and then the reception modes, is available for reception of the total reflected signal RD (t). The signal reflected is directed to selection means 6 by means of a duplexer 5 or any other similar means, for temporal filtering of the signals RD1 (t) and RD2 (t) corresponding to the first and second zones. The selection means may quite simply comprise an analog gate driven by a sequencer 7 supplying a clock signal h and thereby not allowing any other signals to pass then the signals RD1 (t) and RD2 (t) comprised in the total reflected signal RD (t). These signals E (t) and RD (t) appear in FIG. 3 which symbolically indicates for the latter that, firstly, its amplitude is attenuated in time, and that on the other hand, its spectral composition equally changes in time towards the low frequencies.

The two reflected signals RD1 (t) and RD2 (t) are fed to the input of spectrum analysis means 8 which at the output delivers the central frequencies and typical shifts $f_1$ and $\sigma_1$ and $f_2$ and $\sigma_2$ respectively of each of these signals. The formula for calculation of $\alpha$ is applied by calculation means 9. This value of $\alpha$, as well as its abscissa $(d_1+d_2)/2$ may be recorded in a memory 10 which may in particular act as an image memory for visual display on a television monitor 11 of a point M situated at a corresponding abscissa and of which the brightness is of greater or lesser intensity depending on the magnitude of $\alpha$.

The feature which characterises the invention is that the spectrum analysis means 8 comprise means 12 for performing a demodulation in phase quadrature and with respect to the mean frequency $f_0$ of each of the two signals reflected, means 13 for calculating the autocorrelation function R ($\tau$) of the signal produced by the means 12 and means 14 for calculating the derivatives of the first order R' ($\tau$) and of the second order R'' ($\tau$) of these autocorrelation functions. As remains to be explained in the following, they represent the central frequencies $f_1$ or $f_2$ and the typical shifts $\sigma 1$ or $\sigma 2$ of the two signals reflected.

Knowing a signal RD (t) (RD1 (t) or RD2 (t)), the autocorrelation function R ($\tau$) of this signal RD (t) may be written as:

$$R(\tau) = \int RD(t) \cdot RD^*(t-\tau) dt = A(\tau) \cdot e^{j\phi(\tau)}$$

since R ($\tau$) is a complex signal. If RD (t) is a sampled signal, a discrete autocorrelation function may be defined by the following formula:

$$r(\tau) = \sum_p z_p \cdot z^*_{p-1} = X + jY = Z$$

In this formula, P is the total number of samples taken into account for calculation or r ($\tau$), and p is the temporal indication of a sample, p−1 being the sample which had appeared just before the sample p. Moreover, $z_p$ may be expressed as $$z_p = x_p + jy_p,$$

in which expression j is the complex number such that $j^2 = -1$ and in which $x_p$ and $y_p$ are the amplitudes of the samples $z_p$ of the signal RD (t) once it has been demodulated by two oscillators in quadrature and then filtered and quantified. The totality of the samples $z_p$ forms a signal $U = V + jW$, in which V is the totality of the real parts: $x_1, x_2, \ldots x_p$ and W the totality of the imaginary parts: $y_1, y_2 \ldots y_p$ of these samples. The signal U containing all the samples $z_p$ is spoken of as the sampled complex signal. Processing operations performed on a signal RD (t) are elucidated in the following explanation, knowing that it is each of the signals RD1 (t) and RD2 (t) which are part of the signal RD (t), which will actually undergo the processing actions recalled, in its turn.

In FIG. 2, the signal RD (t) is fed simultaneously to a first input of two demodulators 15 and 16 respectively receiving, at their second inputs, signals cos ($2\pi f_0 t$) and sin ($2\pi f_0 t$) in quadrature, supplied by two oscillators 17 and 18 in quadrature. These two demodulators perform a transposition of the spectrum RD (f) of RD (t) by a quantity equal to $f_o$. They perform a demodulation of the so-called quadrature kind, because the signals acting on them via their second inputs are in phase quadrature one with respect to another. By causing each of the demodulated signals to pass through a low-pass filter 19 and 20, respectively, and by sampling them in samplers 21 and 22, respectively, each comprising a blocking sampler followed by an analog-digital converter (CAN), a set of complex quantities is obtained of which the real parts $x_p$ are supplied by the sampler 21 and of which the imaginary parts are supplied by the sampler 22. The sampled complex signal U may be expressed symbolically as $U = V + jW$ knowing that V is the totality of the values $x_1, x_2 \ldots x_p$ and W the totality of the values $y_1 y_2 \ldots y_p$. The device of FIG. 2 also comprises a circuit 13 for calculating the autocorrelation function of the signal RD (t) and a circuit 14 for calculating the derivatives of orders 1 and 2 of this autocorrelation function. Since the signal U sampled is complex, the discrete autocorrelation function r ($\tau$) is complex, and its real part is X, its imaginary part being Y.

It is apparent from the method according to the invention that the disadvantages referred to have been eliminated. In particular, the incidence of interference is of lesser degree since it is one of the properties of an autocorrelation function of a signal that it is denuded of white noise. As a matter of fact, the white noise not being correlated to itself, its autocorrelation function differs from zero only if $\tau$ is nil. For any other value of $\tau$, the irregular variations of the noise signal have the effect that the autocorrelation function of this noise is zero. However, the calculation of the momentum of the order n provided by the general expression for momentum apparent in the foregoing, may be approximated at $\tau$ equal to the sampling period and consequently at $\tau$ differing from 0. It will be demonstrated that this approximation, which is advantageous with regard to noise, is justified. Furthermore, to improve accuracy, it is possible to take an optimum number of samples, under consideration of the stationary state conditions of the action investigated and of the precision to be obtained. This is not possible with the FFT method. Finally, although the mathematical concepts to be manipulated in order to calculate the mean frequency and the typical shift are difficult, the items of equipment applicable and which result from these calculations are uncomplicated and lead to an appreciable reduction of the multiplying operations required to secure the result. As a matter of fact, in the method of the invention, as in that of the prior art utilising FFT materials, the processing of the signals may be performed in digital form, and it may be shown that for a number P of samples taken in each of the two methods, the number of multiplying operations needed in the method according to the invention is smaller in a proportion of $\log_2 P$ of that required in the FFT method ($\log_2 P$ denoting the logarithm of P to the base 2).

In order to calculate the momentum of order 1 of the Fourier transformation RD (f) corresponding to the central frequency of this spectrum, it is possible to state under application of the general expression for the moments:

$$m_1 = \int f \cdot RD(f) \cdot df = \frac{1}{j2\pi} \cdot \frac{dR(\tau)}{d\tau}\bigg|_{\tau=0} = \frac{R(\tau) - R(0)}{j2\pi\tau}$$

The approximation of the first derivative of R ($\tau$) as indicated at the end of this expression is correct since it rests on a property of the autocorrelation function, to the effect that R ($-\tau$) equals R ($\tau$) conjugated. In this case $\tau$ is the sampling period and consequently corresponds to the reciprocal of the sampling frequency. R ($\tau$) may however be expressed as:

$$R(\tau) = A(\tau) e^{j\phi(\tau)}$$

in which expression A ($\tau$) is a real symmetrical function and in which $\phi$ ($\tau$) is a real asymmetrical function. As a result, it may be stated that:

$$\frac{dA(\tau)}{d\tau} = 0 \text{ at } \tau = 0$$

which yields, on completion of the calculations:

$$m_1 = \frac{A(\tau)}{2\pi} \cdot \frac{d\phi(\tau)}{d\tau} \cdot e^{j\phi(\tau)} \text{ at } \tau = 0$$

It is possible to express:

$$\frac{d\phi(\tau)}{d\tau} \text{ in the form } \frac{d\phi(\tau)}{d\tau} = \frac{\phi(\tau) - \phi(0)}{\tau} = \frac{\phi(\tau)}{\tau}$$

since $\phi(0)$ is nil, knowing that $\phi$ ($\tau$) is a real asymmetrical function.

For the same reason, we have:

$$m_0 = R(0) = A(0)e^0 = A(0).$$

Observing that $\phi$ ($\tau$) is the argument of R ($\tau$), it may then be stated:

$$m_1 = \frac{m_o}{2\pi\tau} \cdot Arg(R(\tau)) \simeq \frac{m_o}{2\pi\tau} \cdot Arg(r(\tau))$$

This expression may also be written by expressing r ($\tau$) in its form depending on the samples ($x_p, y_p$). A final expression is consequently obtained for the moment of order 1 of RD (f):

$$m_1 = \frac{m_0}{2\pi\tau} \cdot \text{Arc tg} \frac{\sum\limits_{P}^{P} (y_p \cdot x_{p-1} - y_{p-1} \cdot x_p)}{\sum\limits_{P} (x_p \cdot x_{p-1} + y_p \cdot y_{p-1})} =$$

$$\frac{m_0}{2\pi\tau} \cdot \text{Arc tg} \frac{Y}{X}$$

Since the tangent of the argument of a complex number is equal to the ratio between its imaginary and real parts. As a result, it is apparent that for calculation of $m_1/m_0$ which is of interest to us for reasons of standardisation, it is then sufficient to calculate the real and imaginary parts X and Y of the discrete autocorrelation function r ($\tau$).

The circuit 13 of FIG. 2 comprises delay means 23 for ascertaining, upon receipt of each sample, the quantities $x_p$ and $y_p$ of the sampled complex signal corresponding to the sample of order p and for ascertaining the same elements of the directly preceding sample, that is to say of the order p−1. To this end, the delay means 23 comprise two delay lines 42 and 43, respectively, connected in series with the outputs of the samplers 21 and 22. These delay lines 42 and 43 only deliver at their outputs the data they receive at an instant t at the end of a period t+$\tau$, in which $\tau$ corresponds to the aforesaid sampling period. In practice, these delay lines may be formed by shift registers which receive the binary data of the quantified signal supplied by the samplers at their inputs in parallel and return these data in parallel at their outputs under the action of a clock pulse h generated by the sequencer 7. This sequencer 7 is actuated by the transmission of acoustic pulses E (t).

The delay means 23 moreover comprise a set of multipliers 24 to 27 of which the inputs receive the real parts x or imaginary parts y of the complex signal sampled, corresponding to a given sample and to a preceding sample, in order to perform the following multiplications, respectively, in the rate inforced by the sequencer 7:

$$x_p \cdot x_{p-1}, \; y_p \cdot y_{p-1}, \; x_p \cdot y_{p-1}, \; x_{p-1} \cdot y_p.$$

The circuit 13 for calculation of the autocorrelation function comprises, in series with the delay means 23, summating means 28 comprising two summator-accumulators 29 and 30 connected, respectively, via their inputs to the outputs of the multipliers 24,25 and 26,27. These summator-accumulators perform the calculation of the real values X and imaginary values Y of the autocorrelation function r ($\tau$) for a number P of samples. The number P of successive additions performed by each of the summator-accumulators 29 or 30 may be selected at will, that is to say without limitation to any proportionality to the number 2.

The means 31 for calculating the derivative of order 1 of the autocorrelation function contained in the means 14, comprise a divider 32 performing the division of the imaginary part Y of the autocorrelation function by the real part X of this same function, in accordance with the application of the final expression for the moment of the order 1. An arctangent register 33 connected in series with the divider 32 is supplied at its inputs in an addressing operation with the value of the tangent of an angle sought and delivers the value of this angle at its output. For the purpose of simplification, the divider 32 is a logarithmic divider, meaning that it comprises two logarithm registers, the registers 34 and 35 respectively being addressed with the quantities X and Y. At their outputs, these registers provide the values log X and log Y, respectively. A subtractor 36 receiving the values supplied by these registers produces a result (log Y − log X) which is equivalent to log Y/X. In these circumstances, the register 33 for calculation of the tangent arc (Y/X) is replaced by an exponential tangent arc register of log Y/X. In practice, all the calculations performed by the circuits numbered 23 to 36 may be performed by a microprocessor. In this case, the register 33 is a preprogrammed ROM able to respond to the trigonometric exponential tangent arc transformation.

The general expression for the moments of order n of the Fourier transformation RD (f) of the signal RD (t) renders it possible to state:

$$\frac{d^2R(\tau)}{d\tau^2}\bigg|_{\tau=0} = -4\pi^2 \int f^2 \cdot RD(f) \cdot e^{j2\pi f\tau} df \bigg|_{\tau=0}$$

If R ($\tau$) is replaced in the first term of this equation by its expression as a function of its modulus A ($\tau$) and of its argument $\phi$ ($\tau$), in particular having developed A ($\tau$) in the form of a limited development, and having standardised its typical shift to render it independent of the energy of the signal RD (t), it is possible to state following completion of all the calculations:

$$\sigma^2 = -\frac{1}{2\pi^2\tau^2} \cdot \left(\frac{A(\tau)}{A(0)} - 1\right) = -\frac{1}{2\pi^2\tau^2}\left(\frac{|R(\tau)|}{R(0)} - 1\right)$$

In which expression $\tau$ is the sampling period equal to the reciprocal of the sampling frequency and in which A ($\tau$) is the modulus of R ($\tau$) whereas A (0) is equal to R (0). Once this stage is reached, it is convenient to observe that R (0) is actually the modulus of the autocorrelation function of the signal for $\tau=0$ considering that there is no noise, that is to say its energy. Since the signal RD (t) is actually affected by noise, it is appropriate to replace R (0) by R (0) − N, N being the energy of the noise within the analysis window. In these circumstances, the final expression for the typical difference will be equivalent to:

$$\sigma^2 = -\frac{1}{2\pi^2\tau^2}\left(\frac{|R(\tau)|}{R(0) - N} - 1\right)$$

The means 37 for calculation of the moment of order 2 of the Fourier transformation RD (f) simply perform this last operation. Since the signal is a sampled signal, it is appropriate to replace R ($\tau$) by r ($\tau$). The real part X and the imaginary part Y of this last function are available thanks to the means 13 for calculation of the autocorrelation function, as is apparent from the foregoing, however. The modulus of a complex signal of this kind is equal to the square root of the sum of the squares of the real and imaginary parts. Each of the signals X or Y is also fed to the two inputs of a multiplier which at its output provides a quantity representing the square of the quantity received at the input side. The signals X and Y are received, respectively, at the inputs of the multipliers 38 and 39. A circuit 40 supplied at its inputs with the outputs of the multipliers 38 and 39, performs the operation corresponding to establishing the square root of the sum of the signals fed to its inputs. This being done, the output of the circuit 40 delivers a quantity equal to the module of r ($\tau$).

A circuit 41 receiving the output of the circuit 40 at one of its inputs and at another input a digital quantity proportional to (R(0)−N) establishes the ratio of these two quantities and deducts the quantity 1 from them. Obtaining (R(0)−N) does not raise any difficulties: R(0) is the mean energy of the signal received, meaning the useful signal in the presence of noise. This energy may be measured by any conventional means. In particular, in order to match this measurement to that of the modulus of the autocorrelation function, R(0) is calculated in a similar manner to that of R ($\tau$). Following demodulation in quadrature and sampling, the complex samples of this signal are fed into two multipliers which raise the quantity fed to the input to the power 2. Consequently, there is no delay line in this case: $\tau$ is nil. A cumulative summation is then performed on the products raised to the power 2. The square root of this cumulative summation is established, which is equal to:

$$R(0) = \sqrt{\sum_1^P (x_p)^2 + \sum_1^P (y_p)^2}$$

N is the energy of the noise which is measured by means identical to the preceding means, but during an absence of a useful signal, meaning without any acoustic transmission. The subtraction (R(0)−N) does not raise any difficulties either. The totality of these means is denoted by 44. The circuit 41 consequently provides a signal representing the typical shift of the spectrum RD (f) of RD (t).

In a preferred embodiment, all the operations performed by the operators 37 to 44 under the action of the sequencer 7 are fulfilled by a microprocessor programmed for this purpose. This microprocessor may be the same as that which had been utilised to calculate the mean frequency. It is observed in particular that the circuits 38 and 39 perform multiplications like the multipliers 24 to 27 and that they consequently correspond to operations of an identical kind in the microprocessor which would be utilised. In this case, this microprocessor is also useful for storage in the memory of the results $f_1$, $\sigma_1$ whilst awaiting the arrival of the results $f_2$, $\sigma_2$, to enable the means 9 for calculation of $\alpha$ to ascertain the useful measurements. The method and device which have been described consequently permit resolving the problem posed in an effective manner.

In one example, the typical shift $\sigma$ of E (t) is of the order of 2 MHz around a frequency $f_o=10$ MHz. The period of analysis of the reflected signals RD1 (t) and RD2 (t) is equal to 6.4 microseconds. By definition, there is no relationship between the period of the analysis window and the period of the signal transmitted. The period of analysis is determined by the number of samples required to evaluate the correlation. The period of the signal transmitted is equal to approximately the reciprocal of the spectrum band of the signal. After demodulation in quadrature, the spectra of the reflected signals are returned to around 0 Hz. This means that the useful pass band of these signals is equal to the typical shift and consequently of the order of 2 MHz. If $f_e$ denotes the sampling frequency, $f_e$ is selected in a preferred manner to be such that $f_e$ exceeds five times $\sigma$. In the example recalled, $f_e$ was selected to be equal to 10 MHz. this means that the quantification period of each sample $z_p$ is of the order of 100 nanoseconds. It is consequently possible to take 64 samples from each of the signals RD1 (t) and RD2 (t), so that P=64. The cumulative summators 29 or 30 should consequently be able to operate at the rate of the sampling frequency. For example, they are TDC 1008 or 1009 or 1010 units of the TRW company (USA). Each of these integrated circuits comprises four operators in this example. Each operator performs the multiplication of the operands fed to its inputs on the one hand, and on the other hand the accumulation of the results of its multiplications. In other terms, each operator performs the function of a multiplier (24 to 27) of the delay means and the accumulative part of the function of the summator-accumulators (29 or 30). For the summating action, which is actually a subtraction in the case of the cumulative summator 29, the outputs of two corresponding operators of an integrated circuit of this nature are fed to an adder or subtractor. Cumulative multipliers of this nature supply results coded over 8 bits, 12 bits or 16 bits, respectively. Allowing for the period of 6.4 microseconds of the analysis window, and for the speed c of propagation of the ultrasonic oscillation of 1540 m/s, this leads to a lack of precision in determining the abscissae $d_1$ and $d_2$ of the order of 4.8 mms. As a matter of fact, 64 microseconds $\times$ 1500 m per second /2 (because of the outward and return trajectory) equals 4.8 mms.

The usefulness of the method of the invention become apparent at this juncture. If 4.8 mms is an excessive pitch length to define the medium investigated with sufficient precision, it is possible to elect to adopt a shorter pitch of 3.75 mms for example, which corresponds to 50 samples. The FFT method permitted selecting only 4.8 mms or 2.4 mms, corresponding to 64 or 32 samples respectively, 64 and 32 being powers of 2. The calculation of $\sigma_1$ and $\sigma_2$ as a first approximation is unnecessary. It is possible to make do with the value $\sigma$ of E (t). For a higher degree of precision however, it is preferable to replace $\sigma^2$ by the product $\sigma_1 \cdot \sigma_2$, or by $\sigma_1^2$ or $\sigma_2^2$.

FIG. 3 symbolically shows the complex sampled signals U endowed with their sets of samples $x_q + jy_q$. There certainly appear two sets of samples corresponding, respectively, to the signals RD1 (t) and RD2 (t). The corresponding autocorrelation functions R1 ($\tau$) and R2 ($\tau$) equally appear on the graph of FIG. 3. The spectrums of the signals E (f) and RD (f) are illustrated in FIG. 4. This diagrammatic illustration shows that the spectrum amplitudes decrease as the signal to which they correspond originates from sections ever more distant from the surface of the medium. On the other hand, the central frequency which is the mean frequency of the gaussian distribution of each of these spectrums is equally displaced towards the low frequencies with increasing distance of the sections scanned. The difference which separates the mean frequency $f_o$ of the spectrum E (f) of a limiting central frequency $f_l$ applicable to a limiting scanning section beyond which the results are no longer of significance, is typically of the order of 250 KHz: $f_o - f_l = 250$ KHz. The ultrasonic absorption factor at a point M situated between the zones 1 and 2 and which is equal at this point to the tendency of the central frequency of the reflected signal to vary, is indicated in the same as having been approximated by interpolation between the values of the central frequencies $f_1$ and $f_2$ at either side of this point M.

In accordance with the description of the invention, the absorption factor at at least one point M can be calculated on the occasion of each transmission of a pulse E (t). In order to plot a chart of the absorption factors at all points of the medium, it is then possible to perform a sweep action by acting on the sequencer 7 in a manner such as to cause periodic displacement between one pulse E (t) and another, of the sections 1 and 2 between which it is wished to ascertain the value of this absorption factor. For this reason, the signal E (t) is no longer a pulsed signal comprising a single pulse, but is a repetitive signal of which the period amounts to 40 microseconds for example, in one instance. The difference of duration between this repetitive signal period and that of the pulse E (t) renders it possible to receive a definite number of reflected signals such as RD1 (t) or RD2 (t). In the example described, in which E (t) has a duration of 6.4 microseconds, it is thus possible to receive up to 5 signals such as RD1 (t): because $5 \times 6.4$ microseconds is shorter than 40 microseconds $-6.4$ microseconds.

The method of the invention renders it possible however to exceed this 5 signal limit by proposing an overlap of the signals RD1 (t) over the signals RD2 (t) and consequently of the zones $d_1$ and $d_2$. To this end, the accumulating summators 29 and 30 of FIG. 2 are replaced in FIG. 5 by a set of two shift registers 45 and 46 followed by these accumulating summators. In this case, these shift registers contain 2P divisions (P corresponds to the optimum number of samples). These registers receive the products produced by the multipliers 24 and 25 on the one hand and 26 and 27 on the other hand. At each pulse of the sequencer 7, a pair of real products ($y_p \cdot y_{p-1}$ and $x_p \cdot x_{p-1}$) and a pair of imaginary products ($x_{p-1} \cdot y_p$ and $x_p \cdot y_{p-1}$) respectively, are fed into these shifting registers, whilst a pair of real products and of imaginary products corresponding thereto but of earlier degree (of degree p−P;

$y_{p-P} \cdot y_{p-1-P}, x_{p-P} \cdot x_{p-1-P},$ and $x_{p-1-P} \cdot y_{p-P},$
$x_{p-P} \cdot y_{p-1-P}$)

are extracted from these registers. The accumulating summators then add the products fed in whilst they simultaneously deduct the products extracted. The theoretical precision of the differentiation of a zone 1 compared to a zone 2 is then increased in a proportion equal to P, since upon reception of each sample received it is possible to define a zone which corresponds to the last P products known. In this case, the demodulation and quantification are permanent and the selection of the signals is reduced to its simplest expression: meaning that the results $f_c$ and $\sigma$ are ascertained as and when the samples arrive (every 100 nanoseconds).

However, the information contained in a sample is not completely unaffected by the information contained in an adjacent sample. In order that the central frequency $f_1$ may be appreciably different from the central frequency $f_2$, it is appropriate to operate on the basis of a greater time interval than that of 1 sample. A different procedure may be followed in this case. The accumulating summators 29 and 30 are split into a particular number of accumulating summators. This number depends on the number of central frequencies intended to be established during the repetition period of the signal E(t) transmitted. For example, if it is assumed that 16 samples should separate two successive measurements, that is to say one measurement allowing for the samples nos. 1 to 64, one measurement allowing for the samples nos. 17 to 80, etc . . . , it is appropriate to multiply the number of summators 29 and 30 by 4. In one example, an assembly of gates makes provision for free passage of the products determined by the multipliers towards these accumulating summators. These gates are controlled by the sequencer 7 as a function of the batches of samples in question.

The same assumptions as in FIG. 5 are retained in FIG. 6, but there is shown therein an accumulating multiplier circuit of the integrated type such as those referred to in the foregoing. A circuit 50 of this kind simultaneously receives the sample $z_p$ and the sample $z_{p-1}$ delayed by the delay lines. The accumulation it performs is limited to the number of samples separating the onset of two successive measurements of $f_1$ and $f_2$. It is limited to P/4 samples in one example: say 64/4=16 samples. Thus based on one sample of order k which is given, each of the accumulating multipliers 51 to 54 of the circuit 50 delivers an accumulation of real products $x_{p-1} \cdot x_p$ and $y_{p-1} \cdot y_p$ and of imaginary products $x_p \cdot y_{p-1}$ and $x_{p-1} \cdot y_p$, over a batch of 16 samples. Each of these accumulations of real or imaginary products is fed, upon completion of the processing of each batch, into a shifting addition circuit 55 to 58. The circuits 55 to 58 are identical. The circuit 55 which is the only one described, comprises a shift register 59 having 5 compartments or divisions (64/16+1) driven by the sequencer 7, an adder 60 having three inputs and a memory 61. Each division of the register 59 contains the result of the accumulation of one of the five last successive batches of samples. The adder 60 and the memory 61 form an accumulator of a conventional kind. Since this accumulator of conventional kind operates with the register 59 however, its contents relate to the P(64) last samples ascertained, at the end of the processing of each batch of samples. As a matter of fact, this accumulator of conventional nature performs a recurrent addition of the accumulations supplied by the accumulating multiplier 51 as and when these are received. Furthermore, it deducts the accumulation appertaining to the batch which is lower in order by five orders than the order of the last batch to arrive. Consequently, it permanently contains the sum of the accumulations of the last four batches received. Two summators 62 and 63 connected respectively to the circuits 55 and 56 and to the circuits 57 and 58, provide the real parts X and imaginary parts Y of the discrete autocorrelation function.

In the final analysis, all the operations in this case occur as in the circuit of FIG. 2. However instead of an optimum number P of samples, reduced batches are taken: sub-multiples of P in this case. These batches are recombined by means of the shift registers 45 and 46 of FIG. 5 or by means of the shifting adders 55 to 57 of FIG. 6, to secure a measurement as a function of the optimum number P of the last samples ascertained. The analysis windows of the measurements of $f_1$ and $f_2$ overlap each other partially. The difference of overlap of the analysis windows corresponds to a batch of samples.

Thus, it is possible from batch to batch to define successive and interlaced analysis windows, and the measurements of $f_1$ and $f_2$ consequently correspond to sections $(d_1, d_2)$ close to each other.

What is claimed is:

1. A method of characterising the structure of a medium by calculating the acoustic absorption coefficient of the medium comprising the steps of:
   transmitting a pulsed acoustic signal having a frequency spectrum which is gaussian around a mean frequency towards the medium,
   receiving a first acoustic signal reflected by a first zone of the said medium at a given period, and a second acoustic signal reflected by a second zone of the medium at a subsequent period,
   analyzing the spectrum of the two received reflected signals to obtain the central frequency of the Fourier spectrum of each of these reflected signals,
   calculating the acoustic absorption coefficient of the medium between the said two zones on the basis of the central frequencies obtained for each of these zones, and on the basis of the distance separating these zones,
   wherein the said spectrum analysis comprises
   performing a demodulation in phase quadrature at the mean frequency of the two reflected signals
   calculating the autocorrelation functions of these demodulated signals, and
   calculating the derivatives of the first order of these autocorrelation functions which represent said central frequencies.

2. A device for characterising the structure of a medium, comprising:
   means for transmitting towards the said medium an acoustic pulsed signal of which the frequency spectrum is gaussian around a mean frequency.
   means for receiving the acoustic signal when it has been reflected by the said medium,
   means coupled to said receiving means selected from this reflected acoustic signal first and second reflected signals corresponding to first and second depth zones of the medium,
   means coupled to said selecting means for obtaining by spectrum analysis the central frequencies of the Fourier spectrums of each of these two reflected signals, and
   means coupled to said spectrum analysis means calculating the acoustic absorption coefficient of the medium between the said two zones, on the basis of the central frequencies obtained, and on the basis of the distance separating these zones, in which the said spectrum analysis means comprises
   means coupled to said selection means for performing a demodulation in phase quadrature and at the mean frequency of the two reflected signals,
   means coupled to said demodulation means for calculating the autocorrelation functions of these signals once these have been demodulated, and
   means coupled to said autocorrelation calculating means calculating the derivatives of the first order of these autocorrelation functions representing the central frequencies and for providing outputs representative of said central frequencies to said absorption coefficient calculating means.

3. A method of characterising the structure of a medium comprising the calculations of the acoustic absorption coefficient of this medium comprising the steps of transmitting a pulsed acoustic signal having a frequency spectrum which is gaussian around a mean frequency towards the medium, receiving a first acoustic signal reflected by a first zone of the said medium at a given period, and a second acoustic signal reflected by a second zone of the medium at a subsequent period, analyzing the spectrum of the two reflected received signals to obtain the central frequency and the typical shift of the Fourier spectrum of each of these reflected signals, calculating the acoustic absorption coefficient of the medium between the said two zones on the basis of the central frequencies and of the typical shifts obtained for each of these zones, and on the basis of the distance separating these zones, wherein the said spectrum analysis comprises performing a demodulation in phase quadrature at said mean frequency of the two reflected signals, calculating the autocorrelation function of these demodulated signals, and calculating the derivatives of the first and second orders of these autocorrelation functions which respectively represent said central frequencies and said typical shift.

4. A method as claimed in claim 3, wherein said spectrum analysis comprises:

said demodulation step comprises the step of demodulating each of the received signals, by of two oscillators oscillating in phase quadrature and at the said mean frequency, in order to provide respectively a first and a second pair of demodulated signals, filtering the demodulated signals of each pair and sampling these at a sampling frequency for producing first and second sets of complex quantities which are the real and imaginary parts, respectively of first and second sampled complex signals representing respectively the first and second reflected acoustic signals, autocorrelation function said calculating step comprises calculating for a number of samples and for each said sample complex signal, the discrete autocorrelation function of this complex sampled signal and said derivative calculating step comprises calculating the derivatives of the first and second orders of said autocorrelation function to obtain the central frequency and the typical shift of the Fourier spectrum of each of the reflected acoustic signals, calculating the autocorrelation functions of these demodulated signals, and calculating the derivatives of the first order of these autocorrelation functions which represent said central frequencies.

5. A method as claimed in claim 4, wherein said derivative calculating step comprises calculating the the derivatives of the first and second orders of the autocorrelating function by selecting a number of samples corresponding to a desired precision of measurement.

6. A method as claimed in claim 4, wherein said autocorrelation function calculating step comprises calculating the real part and imaginary part of the discrete autocorrelation functions spearately for calculation of the central frequencies and of the typical shifts.

7. A method as claimed in claim 6, wherein said receiving step comprises receiving the first and second reflected signals with a temporal overlap, partially calculating the real and imaginary parts of the autocorrelation function corresponding to reduced batches of samples, and recombining the results of these partial calculations with each other so that the calculation of the autocorrelation function affects an optimum number of samples exceeding that contained in the batches, the batches being such that the first and last correspond to samples of respectively only the first or only the second signal reflected.

8. A method as claimed in claim 4, wherein said autocorrelation function calculating step comprises calculating the argument of the autocorrelation function of the complex signal sampled for calculation of the central frequency.

9. A method as claimed in claim 3, wherein said transmitting step comprises transmitting the pulsed acoustic signal periodically towards said medium and scanning other zones of said medium with each pulse, wherein said absorption calculating step comprises calculating the acoustic absorption coefficent at different locations in this medium and plotting a chart of the medium investigated.

10. A device for characterising the structure of a medium, comprising:

means for transmitting towards the medium an acoustic pulsed signal of which the frequency spectrum is gaussian around a mean frequency, means for receiving the acoustic signal when it has been reflected by said medium, means for selecting from this reflected acoustic signal first and second reflected signals corresponding to first and second depth zones of the medium, means for spectrum analyzing the central frequencies and the typical shifts of the Fourier spectrums of each of these two reflected signals, and means for calculating the acoustic absoprtion coefficient of the medium between the said two zones, on the basis of the central frequencies and of the typical shifts obtained, and on the basis of the distance separating these zones, in which the said spectrum analysis means comprises, means for performing a demodulation in phase quadrature and at said mean frequency of the two reflected signals, means for calculating the autocorrelation functions of these signals once these have been demodulated, and means for calculating the derivatives of the first and second orders of these autocorrelation functions representing, respectively, said central frequencies and the said typical shifts.

11. A device as claimed in claim 10, wherein said demodulation means comprises two oscillators tuned to said mean frequency in order to obtain first and second pairs of demodulated siganls respectively, means for filtering and sampling each of the demodulated signals and thereby producing first and second sets of complex quantities each of which are the real parts and imaginary parts of a first and second complex signal sampled, said autocorrelation calculating means comprises delay means for delaying selected complex quantities and for calculating the product of a complex quantity corresponding to a sample times the same complex quantity corresponding to an immediately preceding sample, summating means for summating the results provided by the delay means and for thereby calculating the real and imaginary parts of the discrete autocorrelation functions of each of the two complex signals sampled.

12. A device as claimed in claim 11 in which said delay means comprise two delay lines connected to said sampling means, four multipliers coupling to said delay lines for reception at one of their two inputs of the real or imaginary part of a complex quantity relating to a said sample and for reception at their other input of the real or complex part of a complex quantity relating to a said preceding sample and for thereby providing the different terms of the real or imaginary parts of the product of these two complex quantities, and wherein the summating means comprise means for providing signals which represent respectively the sums of the last P real parts and imaginary parts corresponding to the last P products ascertained of the autocorrelation function of the signal reflected.

13. A device as claimed in claim 11, wherein said means for calculating the derivatives comprises means for calculating the derivative of order 1 of the autocorrelation functions comprises dividing means for performing the division of the imaginary parts of these autocorrelation functions by their real parts and means for trigonometric conversion connected to the dividing means to produce a signal representing the arguments of these autocorrelation functions corresponding to the central frequencies of the signals reflected.

14. A device as claimed in claim 13 wherein said selection means comprises means for permitting a partial temporal overlap between the first and second reflected signals, the means for calculating the autocorrelation function comprises means for performing this calculation partially on a portion of the samples in said sets of complex quantities, and means for recombining the results of these partial calculations in a manner such the calculation of the autocorrelation function is performed over an optimum number of samples which exceed that contained in the said set, these sets being such that the first and last set correspond to samples of, respectively, only the first or only the second reflected signal.

15. A device as claimed in claim 10, in which said means for calculating the derivatives comprises means for calculating the derivatives of the second order of the auto-correlation functions and further comprising means for generating signals representing moduli of the autocorrelation functions, means for measuring the intensities of the signals received in the presence of noise and for measuring the noise intensity alone, and algebraic calculation means for producing a signal representing the typical shift from the measurements of these modules and of these two intensities.

16. A device as claimed in claim 10, wherein said means for transmitting comprises means for periodically transmitting the pulses acoustic signal, and said means for selecting comprises means for modifying the selection of the reflected signals, and means for plotting a chart of the absorption characteristics of the different sections fof the said medium.

* * * * *